United States Patent [19]

Darton

[11] Patent Number: 4,755,198
[45] Date of Patent: Jul. 5, 1988

[54] COLUMN FOR TREATING GASES

[75] Inventor: Richard C. Darton, The Hague, Netherlands

[73] Assignee: Shell Oil Company, Houston, Tex.

[21] Appl. No.: 910,790

[22] Filed: Sep. 22, 1986

Related U.S. Application Data

[63] Continuation of Ser. No. 601,113, Apr. 18, 1984, abandoned, which is a continuation of Ser. No. 523,292, Aug. 15, 1983, abandoned, which is a continuation of Ser. No. 341,416, Jan. 21, 1982, abandoned.

[30] Foreign Application Priority Data

Feb. 3, 1981 [GB] United Kingdom ................ 8103267

[51] Int. Cl.⁴ .............................................. B01D 53/14
[52] U.S. Cl. ........................................ 55/237; 55/348; 55/398; 55/92; 261/79.2
[58] Field of Search ................ 55/85, 92, 95, 235–238, 55/228, 229, 240, 260, 398, 344, 348, 457, 442, 443; 261/79 A

[56] References Cited

U.S. PATENT DOCUMENTS

| | | | |
|---|---|---|---|
| 375,983 | 1/1888 | Boehnine et al. | 55/443 |
| 1,983,762 | 12/1934 | Kotzebue | 261/79 A |
| 2,560,075 | 6/1949 | Bloomer | 183/80 |
| 2,599,139 | 6/1952 | Stevenson | 55/442 |
| 3,173,755 | 3/1965 | Picard et al. | 23/78 |
| 3,204,394 | 9/1965 | Kaufmann et al. | 55/442 |
| 3,605,388 | 7/1968 | Zuiderweg et al. | 55/236 |
| 3,624,984 | 12/1971 | Ferrari et al. | 55/85 |
| 3,653,186 | 4/1972 | McLendon | 55/238 |
| 3,765,659 | 10/1973 | Reilly | 55/240 |
| 4,015,958 | 4/1977 | Leschonski et al. | 55/235 |
| 4,059,877 | 11/1977 | Powers | 29/157 R |
| 4,162,150 | 7/1979 | Carson | 55/348 |
| 4,318,368 | 3/1982 | Carson et al. | 55/344 |
| 4,349,360 | 9/1982 | Schuurmans et al. | 55/238 |

FOREIGN PATENT DOCUMENTS

| | | | |
|---|---|---|---|
| 517882 | 3/1953 | Belgium | 55/348 |
| 2538213 | 3/1977 | Fed. Rep. of Germany . | |
| 628975 | 11/1961 | Italy | 55/260 |
| 1509157 | 4/1978 | United Kingdom . | |
| 2000688 | 1/1979 | United Kingdom | 55/260 |

Primary Examiner—Charles Hart

[57] ABSTRACT

A column is provided for treating gases by separating liquid and/or solid contaminants from the gases and then washing the gases with a washing liquid, wherein the presence of the contaminants would adversely affect the washing. The column has a separation space being arranged with respect to a washing space to prevent the washing liquid from contacting the contaminants within the separation space, a vane assembly for imparting a swirling motion to the gases in the separation space to substantially separate the contaminants from the gases, and tubular elements arranged to pass the gases substantially free of contaminants to the washing space.

2 Claims, 3 Drawing Sheets

COLUMN FOR TREATING GASES

This is a continuation of application Ser. No. 601,113, filed Apr. 18, 1984 and now abandoned, which is a continuation of application Ser. No. 523,292, filed Aug. 15, 1983, and now abandoned, which in turn is a continuation of application Ser. No. 341,416 filed Jan. 21, 1982, and now abandoned.

The present invention relates to a column for treating gases, in particular gases containing liquid and/or solid particles.

For treating gases to remove gaseous contaminants frequently columns are applied wherein a gas stream containing gaseous contaminants is contacted with a countercurrently flowing washing liquid. The composition of the washing liquid is so chosen that the gaseous contaminants of the gas stream are dissolved in the washing liquid. Such a treatment is, for example, applied to produced natural gas prior to further transporation of the gas. Natural gas is often produced in a wet condition, that is the flow of predominantly light hydrocarbons often contains water vapour. The water vapour is usually removed prior to the gas entering a pipeline to prevent corrosion of the wall of the pipeline.

To remove the water vapour the gas is supplied into a column where it is contacted with a countercurrently flowing absorbent such as triethylene glycol. By this contact the water vapour is removed by the absorbent. Apart from water vapour the natural gas will in many cases also contain droplets of a heavier hydrocarbon. The presence of such droplets is highly undesirable, as these droplets may easily cause foaming of the absorbent, thereby limiting throughput in the column and entrainment of glycol by the gas stream leaving the column. Therefore, steps are to be taken to remove these droplets from the natural gas prior to contacting the gas with the absorbent.

Another example of the treatment of gases is found in the treatment of reactor effluent streams from the process for hydrocracking oil fractions. Such reactor effluent streams consist of hydrocracked oil, water and a gas, being mainly hydrogen. After separating off the oil and water from the gas, the gas is washed with fresh water to remove traces of ionic contaminants, such as fluoride, ammonia and bisulphide. In this washing process it is important that the gas does not contain oil droplets, since these droplets would severely contaminate the fresh water so that further treatment of the water is necessary before the water is re-used as washing agent.

Although the above examples relate to gases containing liquid contaminants, it is also possible that gases contain solid contaminants, which are to be removed prior to the washing process.

From the above it will be clear that prior to washing a gas, it is important that liquid and/or solid particles which would contaminate the washing liquid are removed from the gas.

A well-known way of doing this is to remove the liquid and/or solid particles from the gas in a separator vessel prior to contacting the gas with a washing liquid in a separate vessel, the wash column. The application of two vessels, however, is expensive, especially at high pressures when specially constructed vessels are necessary.

Therefore, the separating and washing operations are commonly combined in only one vessel. The gas containing liquid and/or solid particles is forced to enter into the lower part of such a vessel in which part the liquid and/or solid particles are removed from the gas stream. The gas then rises to the upper part of the vessel, in which upper part the gas is washed with a counter-currently flowing washing agent. The washing agent is subsequently collected and prevented from flowing into the lower part by the arrangement of a so-called draw-off tray. To permit the gas to flow from the lower part into the upper part of the vessel such a draw-off tray is provided with gas passages. Measures are to be taken to avoid that the washing agent will flow into the lower part of the vessel via said gas passages.

The separation of the contaminants from the gas in the lower part of the vessel is commonly effected by relying on the force of gravity, i.e. without the use of a special separating device. This procedure, however, is not very efficient since the contaminants are easily entrained by the gas entering into the washing space of the vessel. Sometimes the separation is effected by urging the gas with liquid and/or solid particles to pass through a layer of filter material. Such a layer, however, may easily be clogged, in particular when the contaminants are sticky or fouling. The cleaning operation therefore has often to be stopped in order to clean or replace the layer of filter material. Moreover, such a layer of filter material takes up much space, which makes the column larger and therefore expensive, especially when operating at high pressures.

The object of the present invention is to provide a column for separating and washing gases containing contaminants in the form of liquid or solid particles, which column does not have the above-mentioned disadvantages occurring with the known treating column.

According to the invention the column for treating gases containing liquid and/or solid particles comprises a separating space and a washing space, being substantially co-axially arranged and separated from each other by a tray structure provided with at least one opening for the passage of gas, the column further comprising inlet means for supplying a gas containing liquid and/or solid particles into the separating space, the separating space being provided with swirl imparting means for imparting a rotary movement to the gas, the swirl imparting means being arranged within an open-ended tubular element, said swirl imparting means, open-ended tubular element and opening for the passage of gas being substantially co-axially arranged, said swirl imparting means and open-ended tubular element being so arranged relatively to the inlet means that a rotary movement is imparted to the gas prior to reaching the opening for the passage of gas, said separating space further comprising means for separately discharging liquid and/or solid particles from said separating space.

The swirl imparting means are suitably arranged near the tray structure separating the separating space from the washing space, so that a compact construction of the column in possible. The swirl imparting means may be used for long periods without the necessity of replacement or cleaning, as occurring with layers of filter material.

The invention will now be described by way of example in more detail with reference to the drawings, wherein.

Figure 1:
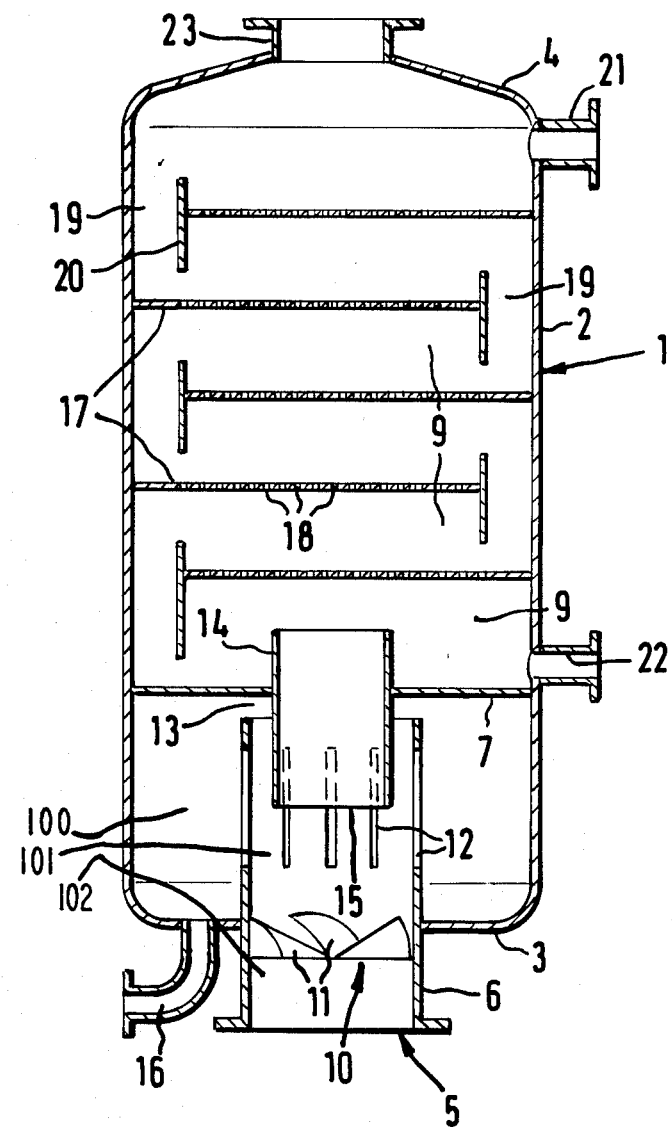
FIG. 1 shows a vertical cross-section of a first embodiment of the invention.

Referring to FIG. 1, a column for treating gases containing liquid and/or solid particles, is indicated by reference numeral 1. The vertically extending column 1 comprising a tubular side wall 2, a bottom wall 3 and a top wall 4, is provided with an inlet opening 5 formed by the lower end of an open-ended tubular element 6 passing through an opening in the bottom wall 3. A tray structure consisting of a horizontal tray 7 divides the interior of the column into a separating space 100 defined by the side wall 2, the outer portion of tubular element 6, bottom wall 3 and tray 7. In the lower part of the open-ended tubular element 6 a vane assembly 10 is positioned, which vane assembly consists of a number of blades 11. That part of the open-ended tubular element 6 which is arranged above the vane assembly 10 and the bottom wall 3 is provided with a number of longitudinal discharge openings 12 arranged around the circumference of said tubular element 6.

As shown in FIG. 1, the upper end of the tubular element 6 is arranged at some distance below the tray 7, thereby creating a fluid passage 13. An open-ended tube 14 for the passage of gas from the separating space 101 through an opening in the tray 7. The tube 14, having its lower end 15 arranged within the tubular element 6, is substantially co-axially arranged with the vane assembly 10. An outlet 16 is arranged in an opening in the bottom wall 3 for removing matter collected on said bottom wall 3.

The washing space 9, being arranged above the tray 7, is provided with a number of parallel washing trays 17 with perforations 18; each tray being so formed that a fluid passage 19 is present allowing the passage of fluid from a tray to a next lower tray. At the location of the fluid passage 19 each washing tray 17 is provided with a vertical plate 20, extending partly above and partly below the tray 17. The vertical plates 20 may be secured to the trays 17 in any suitable manner such as by means of welding. The column 1 further comprises a liquid inlet 21 for the supply of washing liquid into the upper part of the washing space 9. For subsequently removing the washing liquid from said washing space 9 a liquid outlet 22 is arranged near the tray 7. Gas entering into the washing space 9 via the tube 14 is subsequently discharged from said washing space 9 through a gas outlet 23 arranged in an opening in the top wall 4.

In operation a gas stream containing contaminants in the form of, for example, liquid particles is supplied into the separating space 102 vane assembly 10 in the separating space 102 impart a rotary movement to the gas stream. By this rotary movement the liquid droplets in the gas stream are flung outwardly to impinge and coalesce on the inner surface of the upper part of the tubular element 6. The liquid layer thus formed on said inner surface of the tubular element 6 passes partly through the longitudinal openings 12 and partly through the fluid passage 13 between the tray 7 and the tube 6. The separated liquid being collected on the bottom wall 3 is discharged from the separating space 8 via the outlet 16. The gas stream being freed from liquid droplets by the action of the vane assembly 10 subsequently enters into the washing space 9 via the tube 14. In said washing space 9 washing liquid supplied via the liquid inlet 21 is flowing over the washing trays 17. The gas from the tube 14 will flow via the perforations 18 in the trays 17 in upward direction, thereby contacting the washing liquid on said trays 17. By this contact components from the gas stream will be dissolved in the washing liquid. The type of washing liquid to be used depends on the particulars of the components to be removed from the gas. For example, to remove water vapour from natural gas, triethylene glycol may be used as a suitable washing liquid. The time of contact between the gas and the washing liquid on the trays 17 depends amongst other things on the height of the plates 20 above the trays. Once the liquid level has reached the upper end of a plate 20 the washing liquid will fall over the upper edge of said plate 20 towards a next lower tray 17. Once having reached the tray 7, the washing liquid with components entrained from the gas is discharged from the washing space 9 via the liquid outlet 22. The gas treated by the washing liquid is removed from the washing space 9 and discharged via the gas outlet 23. To prevent washing liquid from leaving the washing space 9 via the tube 14, and thereby entering the separating space 8, the upper end of the tube 14 extends above the tray 7 and the liquid outlet 22 is arranged below said upper end of the tube 14. After having removed the components entrained by the washing liquid, the washing liquid may be recirculated into the column via the liquid inlet 21.

Figure 2:
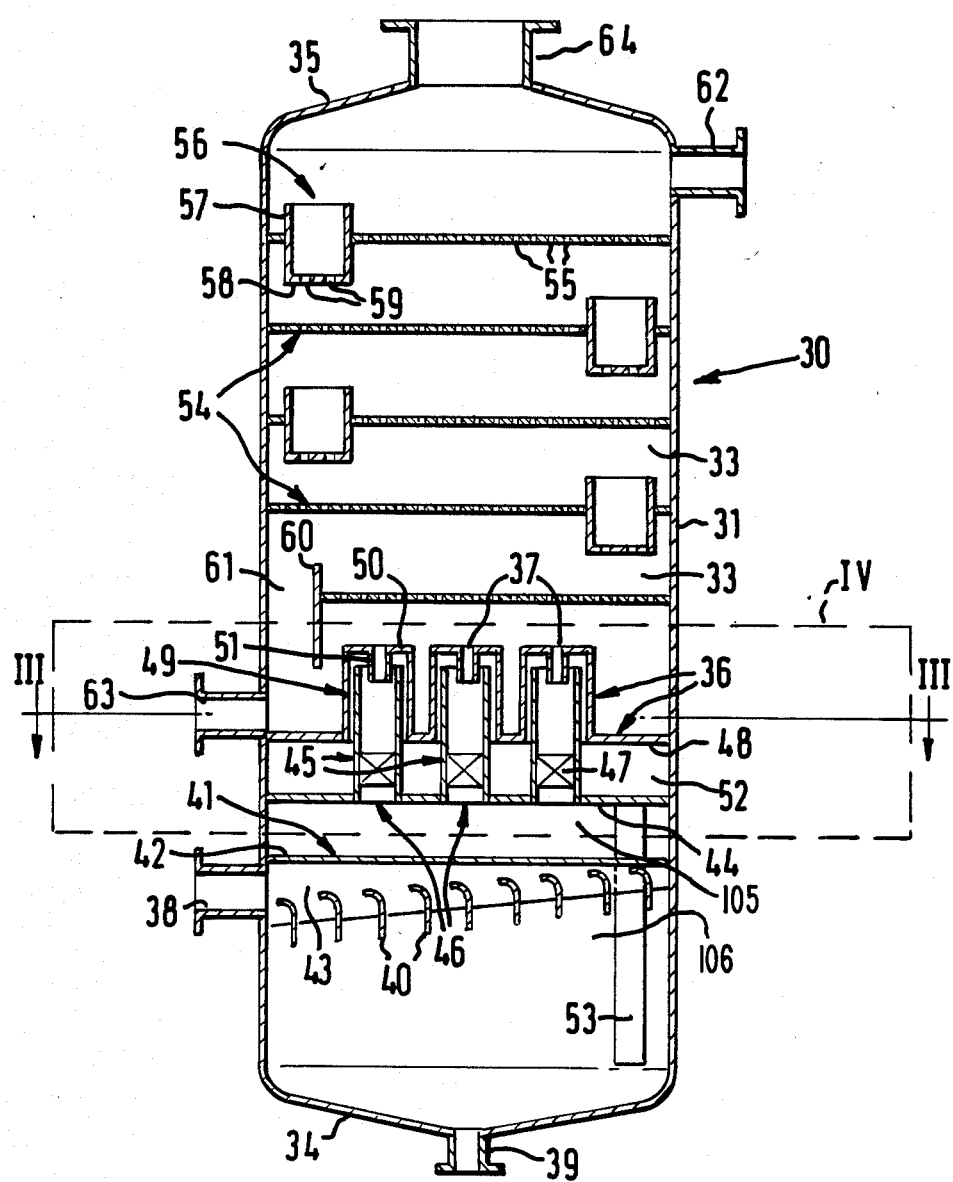
FIG. 2 shows a vertical cross-section of a second embodiment of the invention.
Figure 3:
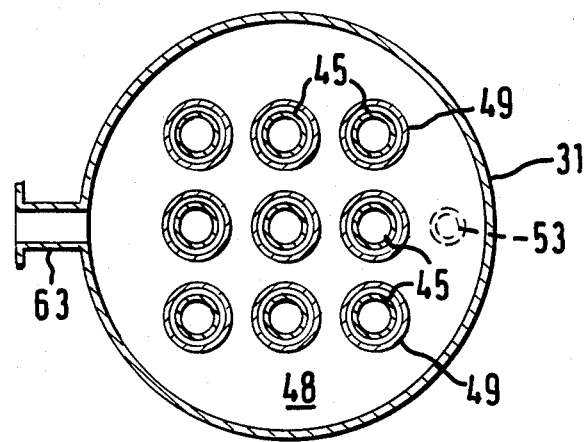
FIG. 3 shows cross-section III—III of FIG. 2.

Reference is now made to FIG. 2 showing a second embodiment of the invention. A column indicated by reference numeral 30 comprises a tubular side wall 31 enclosing in lateral direction a separating space 32 and a washing space 33. The separating space 32 is confined in downward direction by a bottom wall 34 of the column 30. A top wall 35 of the column 30 confines the washing space 33 in upward direction. A tray structure 36, being composed of elements to be described hereinafter, forms the boundary between the separating space 32 and the washing space 33. Openings 37 are provided in the tray structure 36 for the passage of gas from the separating space 32 into the washing space 33. Via an inlet 38 arranged in an opening of the tubular side wall 31 gas may be supplied into the separating space 32. For removing matter collected in the bottom part of the separating space an outlet 39 is arranged in the bottom wall 34. Behind the gas inlet 38, viewed in the direction of the flow of gas, are situated a number of vanes 40, being so arranged that each of the vanes intercepts part of the gas stream from the inlet 38 and deflects it downwardly. The plurality of fixed curved vanes 40 are arranged in a spaced-apart essentially horizontally extending series with each succeeding vane being further away from the means for introduction of gases and contaminants and having its uppermost edge higher than the uppermost edge of the preceding vane and each uppermost edge being directed toward the means for introduction of gases and contaminants and each lowermost edge of each vane being directed downwardly, so that each of the vanes is operative to intercept and deflect downwardly a part of the gases and contaminants and thereby separate a part of the contaminants from the gases. The vanes 40 are arranged in a box-like structure 41 having a top wall 42 and two side walls, one thereof being shown in FIG. 2 and indicated by reference numeral 43. The vanes 40 are bounded at their sides by the said side walls. At some distance above the box-like structure 41 a tray 44 has been arranged, being supported by the tubular side wall 31 of the column 30. A number of tubular elements 45 are arranged in openings 46 of the tray 44. The interior of each of these tubular elements 45 is provided with a vane assembly, schematically shown and indicated by reference numeral 47 in FIG. 2. The tray structure 36, mentioned hereinabove, is so arranged over the tray 44 with the tubular elements 45 that co-axially with each of the vane assemblies 47 an opening 37 of the tray structure 36 is arranged. As already mentioned the openings 37 form the fluid communication between the separating space 32 and the washing space 33. The tray structure 36 consists of a flat tray 48, arranged at some distance above and substantially parallel to the tray 44, a number of tubular elements 49, each thereof being arranged over a tubular element 45 on the tray 44, and cover plates 50 in which the openings 37 are arranged. Downwardly extending tubes 51 are mounted in the openings 37 in such a manner that the lower ends of the tubes 51 are positioned within the tubular elements 45. The space 52 between the tray 44 and the tray structure 36 is in fluid communication with the bottom part of the column 30 via a discharge tube 53.

The washing space 33, confined in downward direction by the tray structure 36 is provided with a number of parallel washing trays 54 having perforations 55 for the passage of gas. Apart from the lowermost washing tray each of the washing trays 54 is provided with a downcomer duct 56 having a tubular side wall 57 and a bottom wall 58. In the bottom wall 58 liquid discharge openings 59 are arranged. Between the inner surface of the tubular side wall 31 and a vertical plate 60 secured to a part of the circumference of the lowermost washing tray 54 a fluid passage 61 is present. A liquid inlet 62 and a liquid outlet 63 are arranged in the side wall 31 for the supply and discharge, respectively, of washing liquid. Finally, a gas outlet 64 is arranged in the top wall 35 of the column 30.

In operation a gas containing contaminants in the form of liquid and/or solid particles is introduced via the inlet 38 into the box-like structure 41 provided with the fixed curved vanes 40, arranged within the separating space 106. Since the vanes 40 have a curved shape the consequence of the inertia and centrifugal force is that the liquid and/or solid particles strike the vane surface and that a separation between those particles and gas is simultaneously effected. The liquid and/or solid particles will fall downwardly towards the bottom wall 34, and are subsequently discharged from the separating space 32 via the outlet 39. The gas stream leaving the box-like structure 41 with the vanes 40 flows in upward direction through space 105 towards the openings 46 in the tray 44. The vanes 40 are arranged in such a manner that substantially equal amounts of gas will enter into the interior of each of the tubular elements 45 via the openings 46. Upon contact with the vane assemblies 47 the liquid and/or solid particles being left in the gas stream leaving the box-like structure 41 are flung outwardly and are subsequently discharged from the tubular elements 45 over the upper ends thereof. The separated liquid and/or solids are collected in the space 52 and subsequently discharged via the discharge tube 53 towards the bottom part of the column and subsequently removed from the separating space 32 via the outlet 39. When the gas to be treated contains mainly solid particles and substantially no liquid particles it is advantageous to use an inclined or curved tray and to install the discharge tube 53 at or near the lowest part of such a tray.

The gas freed from liquid and solid contaminants leaves the separating space 32 and enters into the washing space 33 via the tubes 51. In the washing space washing liquid flows in downward direction after being supplied via the liquid inlet 62. The washing liquid flows from a washing tray 54 towards a next lower washing tray 54 via the downcomer ducts 56. The gas from the tubes 51 flows via the perforations 55 of the trays 54 in upward direction and is thereby contacted with the washing liquid on the trays 54. By this contact components of the gas stream may be dissolved in the washing liquid. The gas freed from specific components is removed from the washing space 33 via the gas outlet 64. The washing liquid having reached the lowermost tray 54 will flow over the upper end of the vertical plate 60 towards the tray surface forming part of the tray structure 36 separating the washing space 33 from the separating space 32. The washing liquid with dissolved gas components is discharged from the washing space 33 via the outlet 63. The vertical plate 60 has its lower end positioned below the level of the openings 37 in the tray structure 36. The gas pressure is so chosen that liquid cannot pass through the perforations 55 but is forced to flow via the downcomer ducts 56 and passage 61 between the column wall 32 and the plate 60 towards the tray 48.

Figure 4:
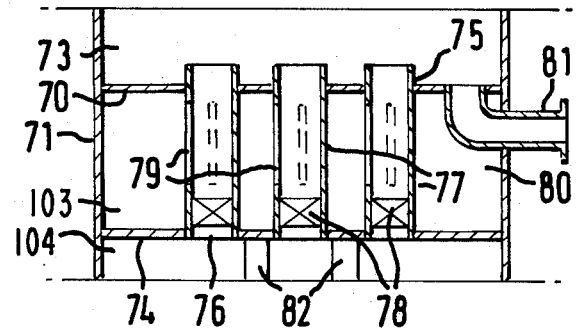
FIG. 4 shows an alternative of detail IV shown in FIG. 2.

Reference is now made to FIG. 4 showing an alternative of detail IV shown in FIG. 2.

A tray structure comprising a flat tray 70 divides the interior of a column having a column wall 71 into a separating space 72 and a washing space 73. A second tray 74 is arranged at some distance below the tray 70. The trays 70 and 74 and provided with a plurality of openings 75 and 76, respectively. The separating space 103 is provided with a plurality of openended tubular elements having side walls 77, each of the elements passing through an opening 75 of the tray 70 and in an opening 76 of the tray 74 to communicate with space 104. The side walls 77 each enclose a vane assembly 78, being schematically indicated in FIG. 4. In each of the side walls 77 a number of longitudinal openings 79 are arranged, allowing the discharge of matter from the space enclosed by the said side wall 77 into the space 80, forming part of the separating space 72, enclosed by the trays 70 and 74 and the column wall 71. It is observed that the upper end of each of the longitudinal openings 79 is positioned at least below the tray 70. The upper tray 70 is further provided with a curved tube 81 for the removal of liquid from the washing space 73. The curved tube 81 passes through an opening in the column wall 71. The lower tray 74 is provided with a number of downwardly extending discharge tubes 82 for discharging matter collected in the space 80 towards the bottom part of the column.

In operation gas containing liquid and/or solid particles, entering into the separating space 72 at a level below the tray 74, is forced to flow into the spaces enclosed by the side walls 77. The vane assemblies 78 subsequently cause a separation of liquid and/or solid particles from the gas. The separated liquid and/or solid particles are discharged via the longitudinal openings 79 in the side walls 77 and subsequently removed from the space 80 via the discharge tubes 82. The main gas streams being freed from liquid and/or solid contaminants enter into the washing space 73 via the open upper ends of the tubular elements having side walls 77. In the washing space 73 the gas is subsequently washed with a washing liquid in the same manner as described above with reference to the preceding figures. The washing liquid flowing in downward direction through the washing space 73 is collected on the tray 70 and discharged via the liquid outlet 81. To avoid washing liquid flowing into the spaces enclosed by the side walls 77, the upper ends of the side walls 77 extended at least above the tray 70.

The present invention is not restricted to swirl imparting means in the form of a vane assembly as shown in FIG. 1. Instead thereof any other type of swirl imparting means, such as a hub with blades, may be applied.

Further, it is observed that the present invention is not restricted to washing spaces provided with trays as shown in FIG. 1 or FIG. 2. It is also possible to replace the washing trays by a system for introducing the washing liquid in the form of a mist into the upper part of the washing space. In this case, the gas flow velocity in the washing space must be rather limited to avoid that washing liquid droplets are entrained by the gas stream. However, the gas flow velocity in the openings 37 and the opening of tube 14 must be rather high to prevent liquid falling down through these openings.

The lowermost tray 54 in the washing space 33 of the column 30 shown in FIG. 2 may be provided with a downcomer duct instead of the shown fluid passage 61.

The present invention is not restricted to discharge tubes 53, 82 arranged in the trays 44 and 74, respectively. Instead thereof, the discharge tube(s) may be arranged in (an) opening(s) in the side wall of the column. Finally, it is observed that FIG. 1 only shows one open-ended tube 6 passing through an opening of the bottom wall 3 of the column 1. Instead thereof a plurality of tubes may be applied each being interiorly provided with swirl imparting means and each passing through an opening in the bottom wall of the column.

I claim:

1. A column for treating gases by separating liquid and/or solid contaminants from the gases and then washing the gases with a washing liquid, wherein the presence of the contaminants would adversely affect the washing, comprising a separation space within the column arranged with respect to a washing space to prevent the washing liquid from contacting the contaminants within the separation space, means for introducing gases and contaminants essentially horizontally into the separation space, a plurality of fixed curved vanes arranged in a spaced-apart essentially horizontally extending series with each succeeding vane being further away from the means for introduction of gases and contaminants and having its uppermost edge higher than the uppermost edge of the preceding vane and each uppermost edge being directed toward the means for introduction of gases and contaminants and each lowermost edge of each vane being directed downwardly, so that each of the vanes is operative to intercept and deflect downwardly a part of the gases and contaminants and thereby separate a part of the contaminants from the gases, a plurality of open ended tubular elements arranged in openings in a tray in an upper end of the separation space, a vane assembly arranged inside each tubular element and operative to impart a swirling motion to separate the remaining contaminants from the gases passing therethrough, a plurality of tubes each having its lower end arranged within each of said tubular elements and substantially coaxially arranged with each vane assembly therein and positioned and arranged to pass the gases substantially free of contaminants to the washing space, means for washing the gases with the washing liquid, means for preventing the washing liquid from flowing into the contaminant separation space of the column and means for collecting and discharging the washing liquid substantially free of contact with the contaminants.

2. The column of claim 1 including a tray structure arranged above and parallel to the tray containing the tubular elements, the tray structure having a plurality of tubular supported cover plates arranged to enclose each tubular element and a tube located in each tubular supported cover plate in such a manner that the lower end of each tube is positioned within each tubular element.

* * * * *